US009049142B1

(12) United States Patent
Osborne et al.

(10) Patent No.: US 9,049,142 B1
(45) Date of Patent: Jun. 2, 2015

(54) METHOD AND APPARATUS TO ENABLE PROTECTION FOR SELECTIVE TRAFFIC IN AN MPLS NETWORK (75) Inventors: Eric W. Osborne, Sutton, MA (US); Prabhu Vaithilingam, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 13/237,351

(22) Filed: Sep. 20, 2011

(51) Int. Cl.
*H04J 1/16* (2006.01)
*G01R 31/08* (2006.01)
*H04L 12/703* (2013.01)
*H04L 12/723* (2013.01)
*H04L 12/911* (2013.01)

(52) U.S. Cl.
CPC ............... *H04L 45/28* (2013.01); *H04L 45/50* (2013.01); *H04L 47/825* (2013.01)

(58) Field of Classification Search
CPC .................. H04L 45/50; H04L 47/787; H04L 2212/0025; H04L 47/825; H04L 41/0654; H04L 45/28
USPC .................... 370/218, 225, 228; 709/232, 239
See application file for complete search history.

(56) References Cited

U.S. PATENT DOCUMENTS

| | | | |
|---|---|---|---|
| 6,895,441 B1 * | 5/2005 | Shabtay et al. | 709/238 |
| 7,633,859 B2 | 12/2009 | Filsfils et al. | |
| 7,940,777 B2 | 5/2011 | Asati et al. | |
| 7,961,600 B2 | 6/2011 | Filsfils et al. | |
| 7,983,153 B2 | 7/2011 | Filsfils et al. | |
| 7,986,640 B2 | 7/2011 | Previdi et al. | |
| 8,842,516 B2 * | 9/2014 | Owens et al. | 370/217 |
| 2005/0201273 A1 * | 9/2005 | Shimizu | 370/216 |
| 2006/0164975 A1 * | 7/2006 | Filsfils et al. | 370/225 |
| 2007/0091911 A1 * | 4/2007 | Watanabe et al. | 370/408 |
| 2010/0322072 A1 * | 12/2010 | Fujihira et al. | 370/230 |
| 2011/0063973 A1 * | 3/2011 | VenkataRaman et al. | 370/228 |
| 2012/0051212 A1 * | 3/2012 | Xu et al. | 370/223 |

OTHER PUBLICATIONS

Moy, J., Request for Comments (RFC) 2328, "OSPF Version 2," Apr. 1998, 215 pages.
Oran, D., Request for Comments (RFC) 1142, "OSI IS-IS Intra-domain Routing Protocol," Feb. 1990, 217 pages.
Andersson, L. Request for Comments (RFC) 5036, "LPD Specification," Oct. 2007, 133 pages.
Rekhter, Y., Request for Comments (RFC) 3107, "Carrying Label Information in BGP-4," May 2001, 8 pages.
Pan, P., Request for Comments (RFC) 4090, "Fast Reroute Extensions to RSVP-TE for LSP Tunnels," May 2005, 38 pages.

* cited by examiner

*Primary Examiner* — Andrew Chriss
*Assistant Examiner* — Romani Ohri
(74) *Attorney, Agent, or Firm* — Novak Druce Connolly Bove + Quigg LLP (57) ABSTRACT

In one embodiment, a technique enables protection, e.g., Fast Reroute (FRR) protection, for selective traffic in an area of a computer network. A source node, located at an edge or perimeter of a network area or located in the core of the network area, may utilize one of a plurality of labels when forwarding traffic to a destination node, wherein a first label ("a protected label") indicates that traffic receive FRR protection and a second label ("an unprotected label") indicates that that traffic not receive FRR protection.

16 Claims, 7 Drawing Sheets

LABEL FORWARDING TABLE
400

| INLABEL 402 | OUTLABEL 404 | OUTIF 406 |
|---|---|---|
| 200 | 100 | Tun, P1 → P4 |
| 250 | 150 | GE 0/0, P1 → P4 |
| ... | | |
| 200 | 100 | Tun, P1 → P4 (VIA FRR) |
| 250 | 300 | GE 1/1, P1 → PE1 |

PRIOR TO FAILURE: rows 1-2
SUBSEQUENT TO FAILURE: last two rows

METHOD AND APPARATUS TO ENABLE PROTECTION FOR SELECTIVE TRAFFIC IN AN MPLS NETWORK

TECHNICAL FIELD

The present disclosure relates generally to computer networks and, more particularly, to providing protection for selective traffic in a computer network, such as, e.g., a Multi-Protocol Label Switching (MPLS) network.

BACKGROUND

A Multi-Protocol Label switching (MPLS) network generally does not provide an easy, scalable way to allow network service providers to sell both protected and unprotected services to their customers. As used herein, a protected service is a service that provides protection, e.g., Fast Reroute (FRR) protection, for a customer's network traffic to protect against a failure in an area of the MPLS network. In contrast, an unprotected service is a service that does not provide FRR protection for the customer's traffic and thus, subjects that traffic to conventional convergence techniques when the failure arises in the network area.

However, it may be desirable for the service providers to offer FRR protection for selective traffic to a destination node of the network area. In conventional techniques, a network area may be configured for "selective" FRR protection by providing at least one full provider edge (PE)-PE node Traffic Engineering (TE) tunnel mesh. Specifically, the full PE-PE TE mesh may be deployed in the network area where the mesh may be utilized for protected customer traffic. However, deploying at least one full PE-PE TE mesh does not scale well with the introduction of new PE nodes into the network area, and thus the service providers may be reluctant to offer "selective" FRR in this manner. As such, the network area may be configured to provide FRR protection for either all of the customer traffic or none of the customer traffic to the destination node in the network area.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a technique enables protection, e.g., Fast Reroute (FRR) protection, for selective traffic in an area of a computer network. A source node, located at an edge or perimeter of a network area (i.e., a source provider edge (PE) node) or located in an interior of the network area (i.e., a source provider core (P) node), may utilize one of a plurality of labels when forwarding traffic to a destination node (i.e., a destination PE node), wherein a first label ("a protected label") indicates that traffic receive FRR protection and a second label ("an unprotected label") indicates that that traffic not receive FRR protection.

Specifically, a core node (i.e., core P node) may distribute to the source node both the protected label and the unprotected label associated with paths to the destination node. After receiving the label distribution, the source node may utilize either the protected label or the unprotected label when forwarding traffic to the destination node. Thus, upon a failure within the network area, the traffic associated with the protected label may receive FRR protection by, e.g., forwarding the traffic over a backup tunnel/path to the destination node. In contrast, the traffic associated with the unprotected label may be subject to convergence and, thus, be forwarded along a micro loop path (e.g., between the core node and the source node) until convergence is completed. Thereafter, the traffic associated with the unprotected label may be forwarded to the destination node via an alternate path in the network area.

Description

A computer network is a geographically distributed collection of nodes interconnected by communication links and segments for transporting information between end nodes, such as personal computers and workstations. Many types of networks are available, with the types ranging from local area networks (LANs) to wide area networks (WANs). The nodes typically communicate over the network by exchanging discrete frames or packets of information (e.g., traffic) according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems (i.e., network areas). Network areas are typically coupled together by conventional "intradomain" routers configured to execute intradomain routing protocols, and are generally subject to a common authority. It may be desirable, however, to increase the number of nodes capable of exchanging data; in this case, interdomain routers executing interdomain routing protocols are used to interconnect nodes of various network areas.

Figure 1:
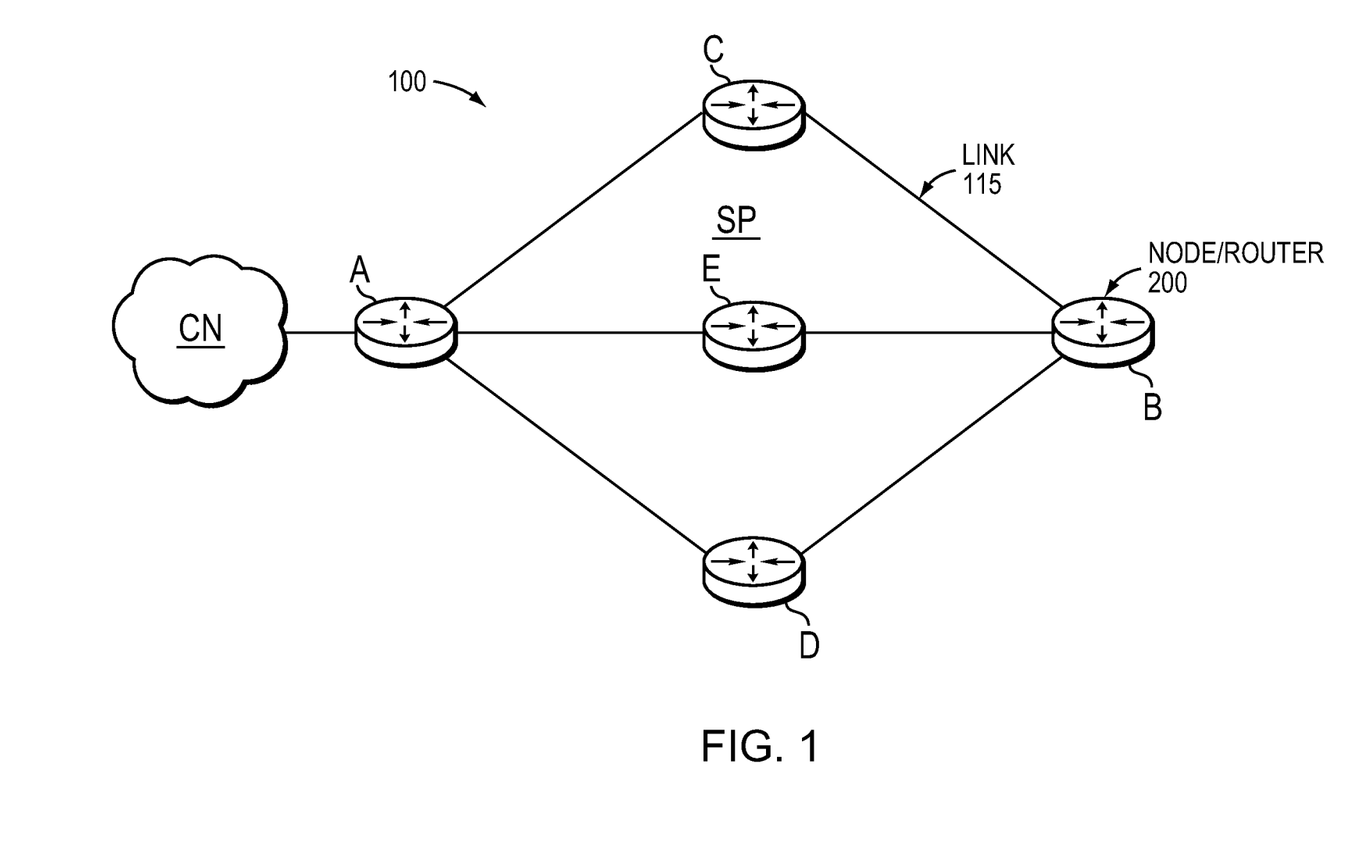
FIG. 1 illustrates an example network area.

FIG. 1 illustrates an example network area 100 (e.g., a service provider network coupled to a customer network). Service provider SP illustratively comprising nodes 200 (e.g., routers A-E) interconnected by communication links 115. As used herein, nodes 200 may be provider edge (PE) nodes located on an edge or perimeter of the network area (e.g., routers A-D) that may be connected to other network areas (e.g., customer network CN), or provider core (P) nodes located in the interior of the network area (e.g., router E). Those skilled in the art will understand that any number of nodes, devices and/or links may be used in the computer network, and that the view shown herein is for simplicity. Those skilled in the art will also understand that while the embodiments described herein are described generally, they may apply to any network configuration within a network area, or throughout multiple network areas.

Nodes in a network area are typically configured to forward information using "interior gateway" routing protocols. These interior gateway protocols (IGP) may define the manner with which routing information and network-topology information are exchanged and processed in the network area. For instance, IGP protocols typically provide a mechanism for distributing network address information corresponding to a set of nodes and subnetworks that are reachable (i.e., accessible) to other nodes in the network area. As such, each node may store the routing and network topology information in, e.g., a routing table so as to maintain a consistent "view" of the network area's topology. Examples of interior gateway routing protocols may include conventional link-state protocols, such as the Open Shortest Path First (OSPF) protocol, the Intermediate-System-to-Intermediate-System (IS-IS) protocol, the Label Distribution Protocol (LDP), the Resource Reservation Protocol (RSVP), and the interior Border Gateway Protocol version 4 (iBGP). The OSPF and IS-IS protocols are well-known and described in more detail in the Internet Engineering Task Force (IETF) publications Request for Comments (RFC) 2328, entitled "OSPF Version 2," dated April 1998 and RFC 1142, entitled "OSI IS-IS Intra-domain Routing Protocol," dated February 1990. Further, the LDP and BGP protocols are well-known and described in more detail in the Request for Comments RFC 5036, entitled "LDP Specification," dated October 2007 and RFC 3107, entitled "Carrying Label Information in BGP-4," dated May 2001.

Figure 2:
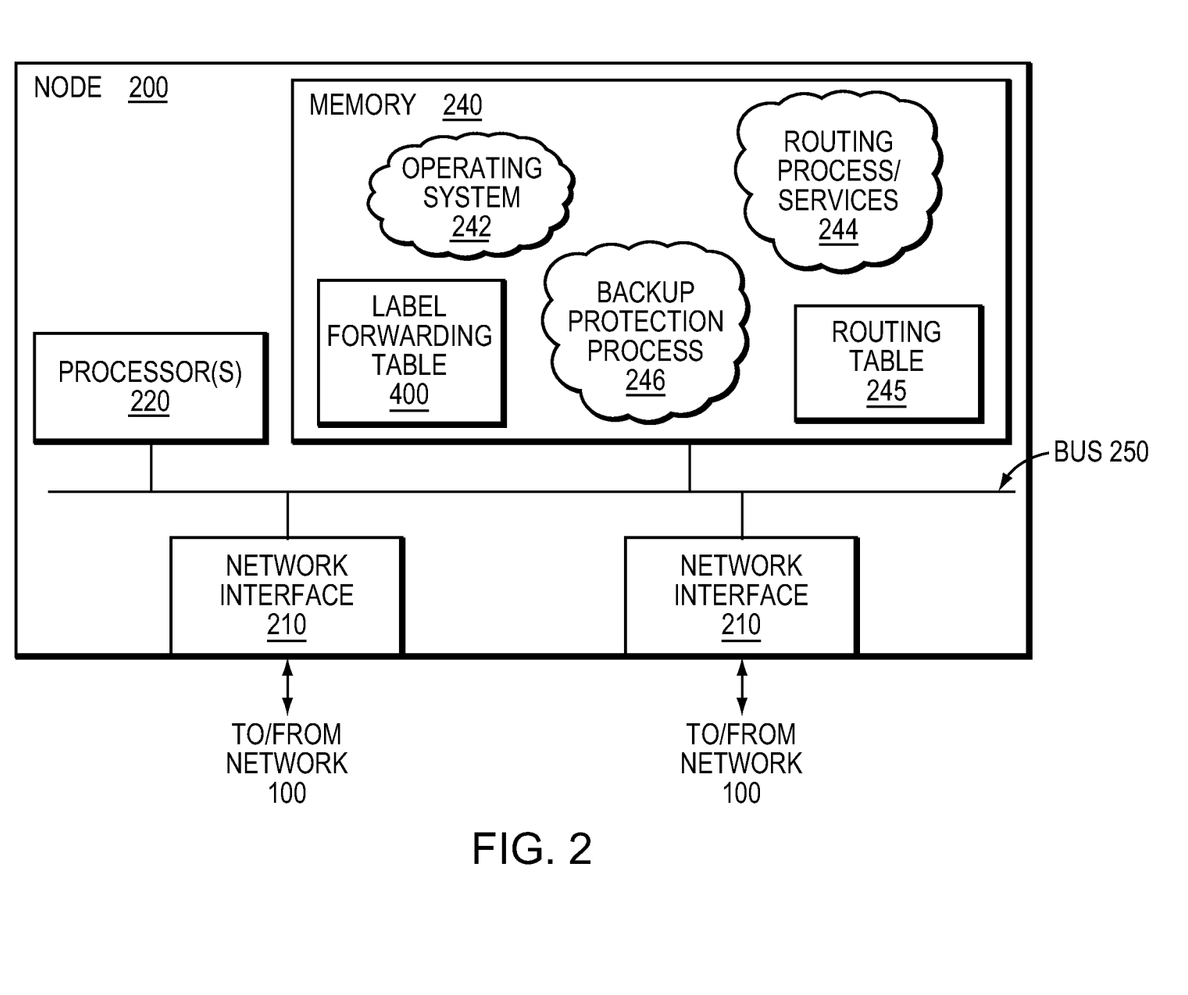
FIG. 2 illustrates an example node.

FIG. 2 illustrates an example network node 200 (e.g., a PE node or a P node) that may be used with one or more embodiments described herein. The node may comprise a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of locations that are addressable by the processor(s) 220 and the network interfaces 210 for storing software programs and data structures associated with the embodiments described herein. The processor 220 may comprise necessary elements or logic adapted to execute the software programs and manipulate the data structures, such as routes or prefixes of a routing table 245 or labels of a label forwarding table 400. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the node. These software processes and/or services may comprise routing process/services 244 and backup protection process 246 that may, for example, facilitate signaling and establishment of backup tunnels described herein. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

Routing process/services 244 contain computer executable instructions executed by processor 220 to perform functions provided by one or more routing protocols, such as IGP (e.g., OSPF, LDP, iBGP, etc.), as will be understood by those skilled in the art. These functions may be configured to manage the routing table 245 and label forwarding table 400 containing, e.g., information used to make forwarding decisions. In particular, changes in the network topology may be communicated among nodes 200 using routing protocols, such as the conventional OSPF and IS-IS link-state protocols (e.g., to "converge" to an identical view of the network topology).

Backup protection process 246 contains computer executable instructions executed by processor 220 to perform functions provided by one or more backup protection protocols, such as Multi-Protocol Label Switching (MPLS) or IP Fast Reroute (FRR). Generally, when a node operates as a point of local repair (PLR), links of the PLR ("local links") may be protected by creating corresponding backup tunnels or backup paths that typically avoid the protected local links (e.g., FRR). The backup tunnels may traverse one or more backup links to reach a merge point, which takes traffic diverted onto the backup tunnel and reinserts it into the data stream, having bypassed the failed link (or having detoured around the failed node).

Assume a node in the network area detects a change in the network area's topology. The node may become unable to communicate with one of its neighboring nodes, e.g., due to a failure of a link between the nodes or the failure of a neighboring node, or any other type of network topology failure where FRR may be utilized. If the detected failure occurred within the network area, the detecting node may update the information stored in its routing and label forwarding tables and advertise the intradomain topology change to other nodes in the network area using an IGP, such as those described herein. There is an inherent latency associated with propagating the network topology change within the network area and having nodes in the network area update their tables so as to converge on a consistent view of the new network topology, i.e., without the failed node or link. Micro loop paths may occur when a network change takes places and the nodes converge on the new network topology at differing times. Prior to full convergence in the network area, there is a risk that one node may forward traffic using routing and forwarding information reflective of the old network topology whereas another node may forward traffic using information reflective of the new network topology, such that the traffic may propagate back and forth between two or more nodes along a micro loop path in the network area.

To obviate delays associated with updating routing tables when attempting to avoid a failed network element (i.e., during convergence), some service providers have employed MPLS and/or IP FRR as backup tunneling mechanisms. MPLS may be utilized in connection with FRR to quickly and efficiently reroute network traffic over a backup tunnel, i.e., a repair path, in response to a failure in a network area. For example, upon identifying a protected node or communication link has become inaccessible or otherwise inoperative, the node immediately upstream to the failed network element (e.g., link or node) may reroute network traffic normally traversing the failed network element via the repair path. As such, the node (e.g., a PLR) does not "drop" received packets as a result of the network failure. The repair path may be deployed as a FRR data path, e.g., using MPLS or IP FRR techniques. Specifically, this enables traffic carried by label switched paths (LSPs) that traverse a failed link to be rerouted around the failure. The reroute decision is controlled locally by the node coupled to the failed link where the node, upon detecting the link failure, "pushes" e.g., a new label onto a stack to forward the traffic over the backup tunnel. Examples of MPLS FRR repair paths are well defined and described in RFC 4090, entitled "Fast Reroute Extensions to RSVP-TE for LSP tunnels," dated May 2005.

The MPLS protocol may be used as a tunneling mechanism to ensure that nodes forward packets along predetermined LSPs. Each LSP defines a logical data path between a pair of nodes; the nodes situated along the LSP may be determined using reachability information provided by conventional IGPs, such as OSPF. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label lookup operation, from its label forwarding table, to determine a packet's next-hop destination. MPLS Traffic Engineering (TE) provides additional advantages over IP-based routing, such as enabling MPLS-configured nodes to reserve network resources, such as bandwidth, to ensure a desired quality of service (QoS).

Figure 3:
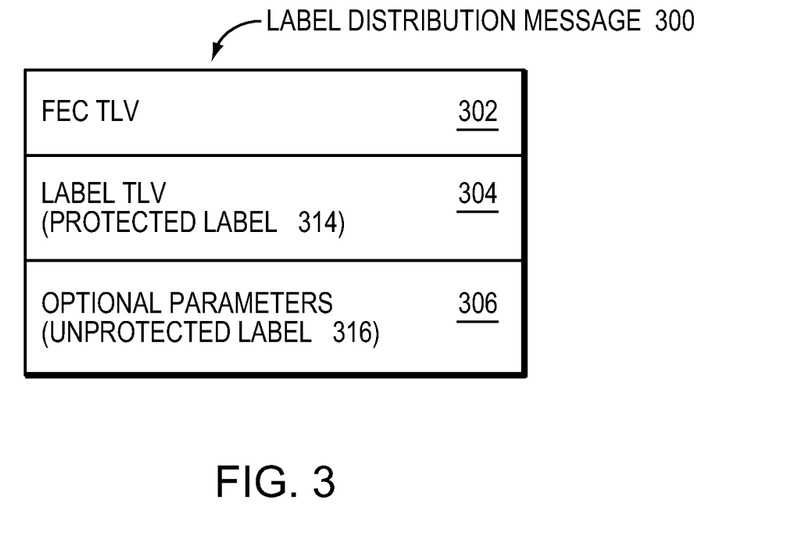
FIG. 3 illustrates an example label distribution message.

Each destination node represented via a LSP is associated with a locally allocated label value at each hop of the LSP, such that the locally allocated label value is carried by data packets forwarded over its associated hop. The MPLS label values are typically distributed among the LSP's nodes using messages associated with an IGP label distribution protocol, such as, e.g., the LDP, RSVP or iBGP protocol. FIG. 3 illustrates an example label distribution message 300 illustratively embodied as an LDP binding message. Those skilled in the art will understand, however, that other IGP messages, such as, e.g., iBGP or RSVP messages/advertisements, may be used in accordance with the embodiments disclosed herein. The label distribution message 300 may include, inter alia, a Forwarding Equivalence Class (FEC) Type-Length-Value (TLV) field 302. According to one or more embodiments described herein, FEC TLV field 302 may store a value associated with a destination node. Further, message 300 may include Label TLV field 304 that stores a value for a protected label 314 associated with the destination node. Moreover, the message may include Optional Parameters field 306 that stores a value for an unprotected label 316 associated with the destination node.

Figure 4:
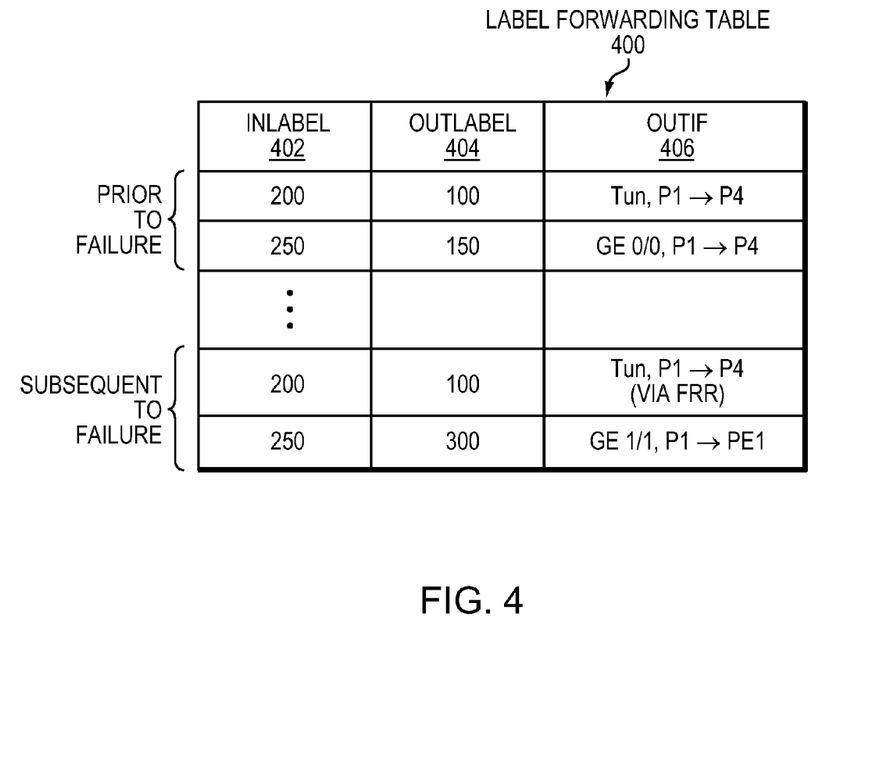
FIG. 4 illustrates an example label forwarding table.

Operationally, when a packet is received at a MPLS-configured node, the node extracts the packet's transported label value, e.g., stored at a known location in the packet's encapsulating headers. The extracted label value is used to identify, e.g., in the label forwarding table 400 of the MPLS-configured node, the next network node ("next hop") to forward the packet. Typically, an IGP label identifies the packet's next hop within the network area. More generally, the IGP label may be a MPLS label or any other encapsulation header used to identify the packet's next hop in the network area.

FIG. 4 illustrates an example label forwarding table 400 that may be used by a node (e.g., a PLR) within a network area to make forwarding decisions. Label forwarding table 400 may include, inter alia, InLabel column 402, OutLabel column 404, and OutIF column 406. InLabel column 402 may store a value corresponding to a protected or unprotected input label (e.g., corresponding to a protected/unprotected label extracted from a received packet) associated with a destination node. Further, OutLabel column 404 may store a value corresponding to a protected or unprotected output label (e.g., corresponding to a protected/unprotected label inserted into a transmitted packet) associated with the destination node. Moreover, OutIF column 406 may store a value corresponding to an output interface over which the protected or unprotected packet may be transmitted to the destination node. For example, a node in a network area may receive a data packet, where the data packet includes a particular input label associated with a destination node (e.g., corresponding to protected or unprotected input label). The node may extract the input label from the packet and use the extracted label to index into its label forwarding table 400 (i.e., to compare the extracted label with an input value label of the InLabel column 402). In response to a match, the node may determine which output label to insert into the packet and over which output interface to transmit the packet. It is noted that the values utilized in the label forwarding table as shown in FIG. 4 are simply exemplary in nature and that other values may be used.

As noted, it may be desirable for the service providers to offer FRR protection for selective traffic to a destination node of the network area. In conventional techniques, a network area may be configured for "selective" FRR protection by providing at least one full provider edge (PE)-PE node Traffic Engineering (TE) tunnel mesh. Specifically, the full PE-PE TE mesh may be deployed in the network area where the mesh may be utilized for protected customer traffic. However, deploying at least one full PE-PE TE mesh does not scale well with the introduction of new PE nodes into the network area, and thus the service providers may be reluctant to offer "selective" FRR in this manner. As such, the network area may be configured to provide FRR protection for either all of the customer traffic or none of the customer traffic to the destination node in the network area.

Selective Traffic Protection in an MPLS Network

According to one or more embodiments of the disclosure, a technique enables protection, e.g., Fast Reroute (FRR) protection, for selective traffic in an area of a computer network. A source node, located at an edge or perimeter of a network area (i.e., a source provider edge (PE) node) or located in an interior of the network area (i.e., a source provider core (P) node), may utilize one of a plurality of labels when forwarding traffic to a destination node (i.e., a destination PE node), wherein a first label ("a protected label") indicates that traffic receive FRR protection and a second label ("an unprotected label") indicates that that traffic not receive FRR protection.

Specifically, a core node (i.e., core P node) may distribute to the source node both the protected label and the unprotected label associated with paths to the destination node. After receiving the label distribution, the source node may utilize either the protected label or the unprotected label when forwarding traffic to the destination node. Thus, upon a failure within the network area, the traffic associated with the protected label may receive FRR protection by, e.g., forwarding the traffic over a backup tunnel/path to the destination node. In contrast, the traffic associated with the unprotected label may be subject to convergence and, thus, be forwarded along a micro loop path (e.g., between the core node and the source node) until convergence is completed. Thereafter, the traffic associated with the unprotected label may be forwarded to the destination node via an alternate path in the network area.

Figure 5:
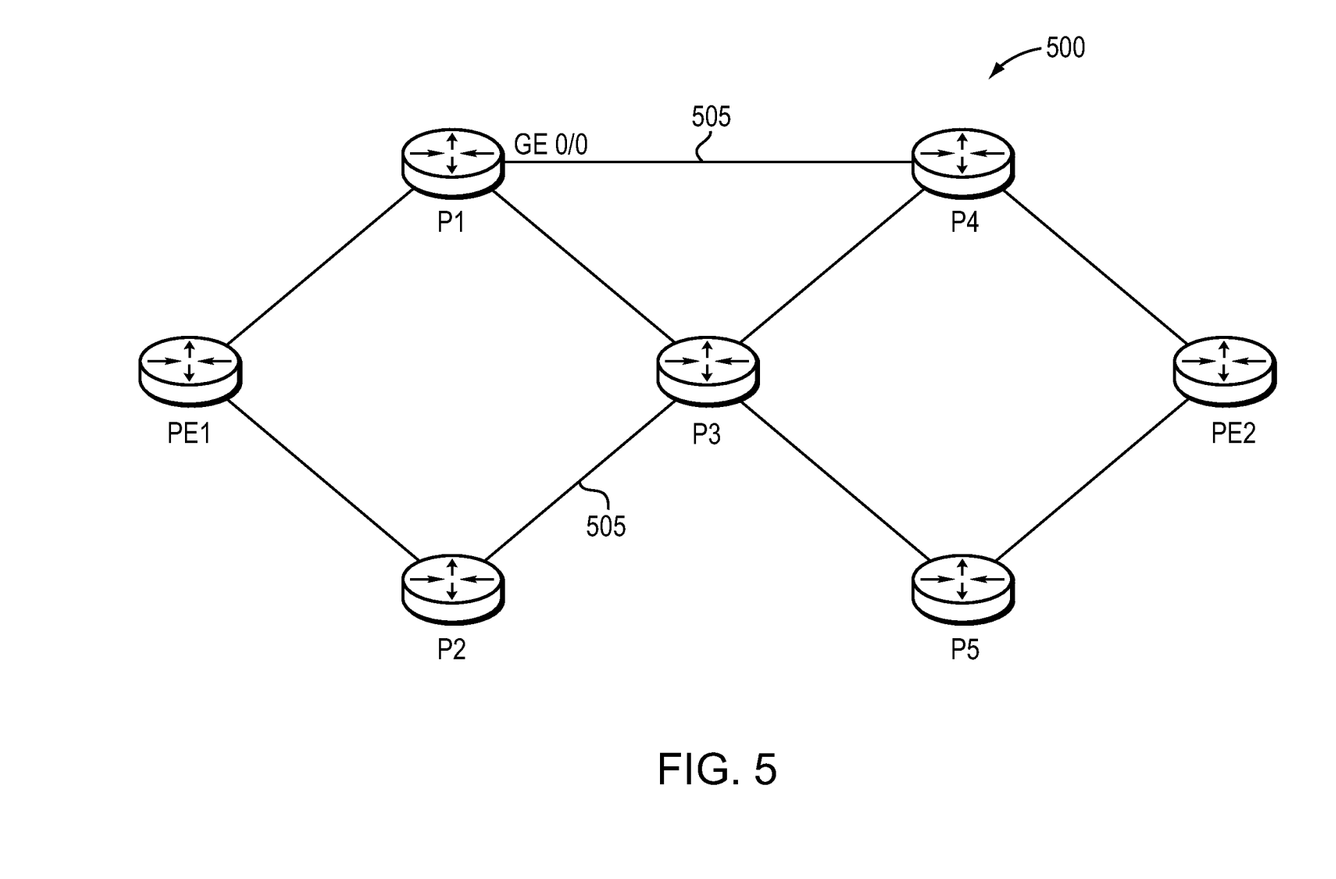
FIG. 5 illustrates an example network area configured to provide selective traffic protection prior to a failure in the network area.

FIG. 5 illustrates an example network area 500 of a service provider that is configured to provide selective traffic protection prior to a failure in the network area. In an illustrative embodiment described herein, the network area includes a plurality of nodes located at the perimeter of the network area (e.g., PE1-PE2) and in the interior ("core") of the network area (P1-P5). Further to the illustrative embodiment, nodes 200 are interconnected by communication links 505. Those skilled in the art will understand that any number of nodes and links may be used in the computer network, and that the view shown herein is exemplary in nature. Those skilled in the art will also understand that the location of the nodes in network area 500 is exemplary in nature and that there may be more or less nodes located on the perimeter or in the core of network area 500.

According to one or more embodiments described herein, core node P1 of network area 500 may distribute to source node PE1 both a protected label and an unprotected label associated with paths to destination node PE2. Illustratively, P1 may send an LDP binding message 300 to PE1, wherein the LDP binding message may include specific values associated with the paths followed by traffic to PE2, e.g., a value for a protected label 314 associated with selective traffic destined to PE2 and a value for an unprotected label 316 associated with unprotected traffic destined to PE2. For example, P1 may distribute to PE1 a value for the protected label equal to 200 and a value for the unprotected label equal to 250. It is noted that other protocols or forms of messages may be used to distribute the protected and unprotected labels for a particular destination node. It is further noted that P1, or a different core P node, may send LDP binding messages to other source nodes (e.g., other PE or P nodes) in the network, wherein the binding messages include specific values (e.g., a protected label and an unprotected label) associated with paths traversed by traffic destined to any destination node in the network.

After receiving the label distribution from P1, PE1 may utilize either the protected label of 200 or the unprotected label of 250 when forwarding traffic from PE1 to PE2. Assume that PE1 is coupled to a customer site (not shown) and that it is desired to forward traffic from that customer site through network area 500 to a destination prefix (not shown) reachable by PE2. The service provider may desire to provide FRR protection for only selective traffic to PE2 of the network area. Thus, for the customer traffic receiving FRR protection, PE1 may assign protected label 200 to packets (e.g., insert label 200 into the packets) associated with the protected traffic. However, for customer traffic that does not receive FRR protection, PE1 may assign unprotected label 250 to the packets (e.g., insert label 250 into the packets) associated with the unprotected traffic.

Prior to a failure in the network area, all customer traffic is illustratively forwarded over the same primary path, e.g., PE1-P1-P4-PE2. Assume, P1 receives a packet from PE1 that is to be forwarded to PE2, and that packet may have either an input label 200 for protected traffic or an input label 250 for unprotected traffic. Upon receiving the packet from PE1, P1 (e.g., a PLR) performs a look-up operation into its label forwarding table 400 (FIG. 4) to determine which output label should replace the input label associated with the received packet. Using the table 400, P1 may determine that if the received packet has the protected input label of 200 (e.g., stored in InLabel column 402), then the corresponding output label for the packet is 100 (e.g., stored in OutLabel column 404). Similarly, P1 may determine that if the received packet has the unprotected input label of 250, then the corresponding output label for the packet is 150. Furthermore, P1 may determine over which output interface to transmit the packet (e.g., stored in OutIF column 406). As noted above all customer traffic is forwarded over the same primary path; accordingly protected (packet) traffic and unprotected traffic may illustratively be transmitted over an output interface coupled to the P1→P4 link. Further, when P4 receives the packet with either input label 100 or input label 150, P4 performs a lookup operation into its label forwarding table and, in response to a match on the input label, replaces the input label with a corresponding output label and transmits the packet over an appropriate output interface. As a result, each next hop along the LSP receives the packet with a corresponding input label, and utilizes the input label to index into the next hop's label forwarding table to determine which output label should replace the input label. This process is repeated until the packet reaches PE2.

Figure 6:
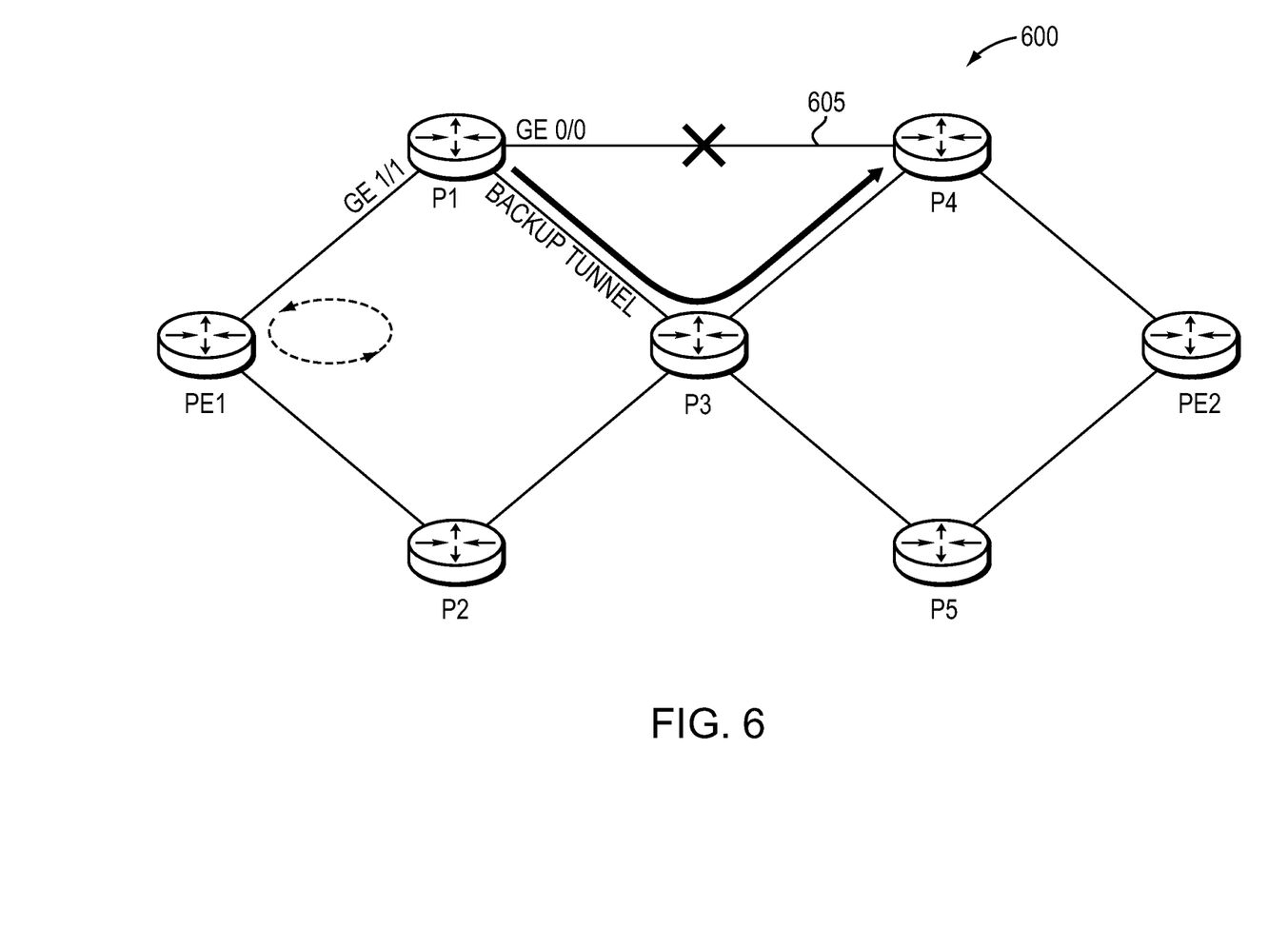
FIG. 6 illustrates an example network area configured to provide selective traffic protection subsequent to a failure in the network area.

FIG. 6 illustrates an example network area of a service provider that is configured to provide selective traffic protection subsequent to a failure in the network area. Here, assume that a failure occurs over the primary path and, in particular, over link 605 between P1 and P4, within network area 600 as indicated by the mark "X". Subsequent to the failure of link 605, all traffic with the protected label of 200 may receive FRR protection, while the traffic with the unprotected label of 250 may be subject to convergence and, thus, be forwarded along a micro loop path until convergence is completed. Thereafter, the traffic may be forwarded to the destination node utilizing an alternate path. For example, in response to detecting the failure on the primary path, P1 may forward the packets with the protected label of 200 to a next node, e.g., P3, to thereby forward the packets over the repair path PE1-P1-P3-P4-PE2, and, in particular, over a backup tunnel path P1-P3-P4. However, the packets with unprotected label of 250 may be forwarded from P1 back to PE1 (e.g., to form a micro loop path as indicated by the dotted circle) until convergence is completed, at which time PE1 may determine that the unprotected packets should be forwarded via P2 to reach PE2. Thus, if the received packet has input label 200 (e.g., a protected label), P1 replaces input label 200 with output label 100 and transmits the packet over an appropriate interface coupled to the repair path, e.g., tunnel, P1→P4 (via FRR). Similarly, if the received packet has input label 250 (e.g., an unprotected label), P1 replaces the input label 250 with output label 300 and transmits the packet over an appropriate interface coupled to PE1, e.g., gigabit Ethernet (GE) 1/1, P1→PE1). Advantageously, "selective" FRR protection may be provided for the traffic routed between PE1 and PE2 in the network area.

Figure 7:
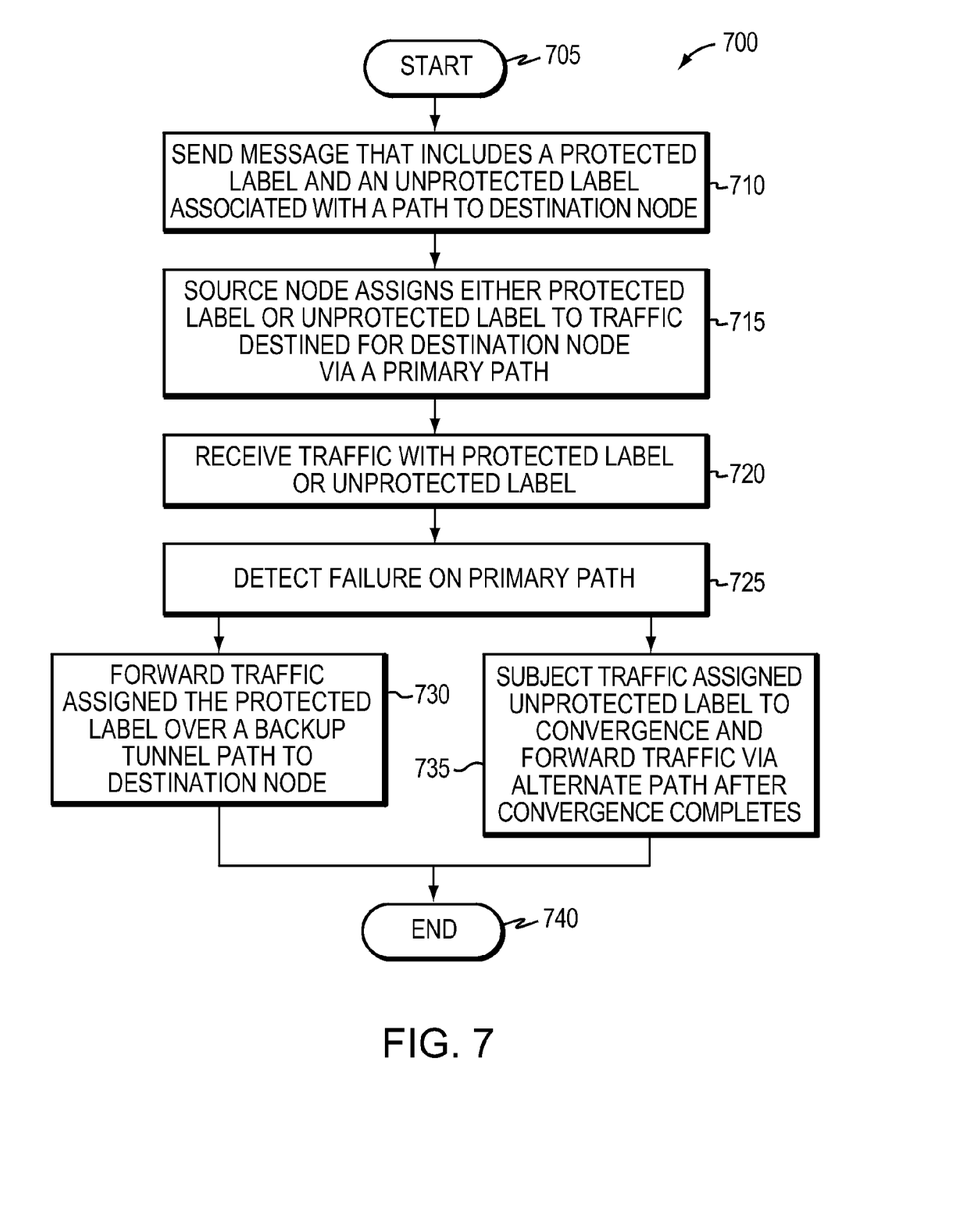
FIG. 7 illustrates an example simplified procedure for performing selective traffic protection in a network area.

FIG. 7 illustrates an example procedure for performing selective traffic protection in a network area in accordance with one or more embodiments described herein. The procedure 700 starts at step 705 and continues to step 710 where a core node, e.g., a core P node, sends one or more label distribution messages (i.e., binding messages) to nodes of the network area, wherein each message includes a protected label and an unprotected label associated with paths to a destination node, e.g., a destination PE node. In step 715, a source node, e.g., a source PE node, assigns either the protected label or the unprotected label to traffic destined for the destination PE node via a primary path. In step 720, the P node receives traffic with the protected label or the unprotected label from the source PE node. At step 725, a failure on the primary path is detected. At step 730, and in response to the failure, traffic assigned the protected label is forwarded over a backup tunnel path to the destination PE node. At step 735, and in response to the failure, traffic assigned the unprotected label is subject to convergence and forwarded along, e.g., a micro loop path, until convergence completes. Thereafter, the traffic assigned the unprotected label is forwarded to the destination PE node via an alternate path. The procedure then ends at step 740.

Advantageously, the technique described herein allows a service provider to sell both protected and unprotected services to its customers for traffic that terminates on a same destination (PE) node of a network area. The technique also allows service provider operators/administrators to sell both services while requiring minimal changes to their core and edge network infrastructures. To that end, the novel technique allows provisioning of the protected service to be controlled by a source node to a desired granularity.

While there has been shown and described illustrative embodiments for performing selective protection in an MPLS network, it is to be understood that various other adaptations and modifications may be made within the spirit and scope of the embodiments disclosed herein. For example, the network area may be a single service provider comprising a plurality of autonomous systems or a different collection of nodes that comprise a single network area. Further, different methods and/or different types of messaging may be used to distribute the protected and unprotected labels within the network area. Further, it will be apparent that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   sending, to a source node in a computer network, the source node including a processor, a plurality of labels, a first label of the plurality of labels corresponding to a protected label and a second label of the plurality of labels corresponding to an unprotected label;
   receiving, from the source node, traffic destined for a destination node located on a perimeter of a network area of the computer network, the traffic including at least a first packet and a second packet being forwarded over a primary path through the network area, the first packet associated with the first label corresponding to the protected label and the second packet associated with the second label corresponding to the unprotected label;
   detecting a failure on the primary path;
   forwarding the first packet over a backup tunnel path to the destination node based at least in part on the first label associated with the first packet; and
   forwarding the second packet along an alternate path to the destination node, wherein forwarding the second packet along the alternate path to the destination node includes forwarding the second packet along a loop formed with the source node, before the second packet is routed towards the destination node.

2. The method of claim 1, wherein one of the first packet or the second packet is received at a core node that is not located on the perimeter of the network area.

3. The method of claim 2, wherein the failure on the primary path is a link failure of a link coupled to the core node.

4. The method of claim 2, further comprising:
   replacing, by the core node, the protected label of the first packet with a corresponding first output label based on a label forwarding table of the core node, the first output label having a value identifying a next network node to forward the first packet to in response to detecting the failure.

5. The method of claim 4, further comprising:
   replacing, by the core node, the unprotected label of the second packet with a corresponding first output label based on the label forwarding table of the core node the first output label having a value identifying a next network node to forward the first packet to in response to detecting the failure.

6. The method of claim 1, further comprising:
   forwarding the second packet assigned the unprotected label from the source node to the destination node over an alternate path.

7. An apparatus, comprising:
   one or more network interfaces adapted to communicate data, including messages, over a network area of a computer network;
   a processor coupled to the one or more network interfaces and adapted to execute one or more processes; and
   a memory configured to store a process executable by the processor, the process when executed operable to:
   send a plurality of labels to a source node, a first label of the plurality of labels corresponding to a protected label and a second label of the plurality of labels corresponding to an unprotected label;
   receive, from the source node, a message destined for a destination node via a primary path through the network area, the message including at least a first packet and a second packet, the first packet associated with the first label corresponding to the protected label and the second packet associated with the second label corresponding to the unprotected label;
   detect a failure on the primary path;
   forward the first packet over a backup tunnel path to the destination node based at least in part on the first label associated with the first packet; and
   forward the second packet over an alternate path to the destination node, wherein forwarding the second packet along the alternate path to the destination node includes forwarding the second packet along a loop formed with the source node, before the second packet is routed towards the destination node.

8. The apparatus of claim 7, wherein the failure on the primary path is a link failure.

9. The apparatus of claim 7, wherein the second packet assigned the unprotected label is forwarded along path formed with the source node.

10. The apparatus of claim 7, wherein the process when executed is further operable to:
    replace the protected label of the first packet with a corresponding first output label based on a label forwarding table, the first output label having a value identifying a next network node to forward the first packet in response to detecting the failure.

11. The apparatus of claim 7, wherein the backup tunnel path is established in accordance with Multi-Protocol Label Switching.

12. The apparatus of claim 7, wherein the backup tunnel path is established in accordance with Internet Protocol.

13. A tangible, non-transitory, computer-readable media having software encoded thereon, the software when executed by a processor operable to:
    send a plurality of labels to a source node, a first label of the plurality of labels corresponding to a protected label and a second label of the plurality of labels corresponding to an unprotected label;
    receive, from the source node, traffic destined for a destination node via a primary path through a network area, the traffic including at least a first packet and a second packet, the first packet associated with the first label corresponding to the protected label and the second packet associated with the second label corresponding to the unprotected label;

detect a failure on the primary path;

forward the first packet over a backup tunnel path to the destination node based at least in part on the first label associated with the first packet; and forward the second packet along an alternate path to the destination node, wherein forwarding the second packet along the alternate path to the destination node includes forwarding the second packet along a loop formed with the source node, before the second packet is routed towards the destination node.

14. The tangible, non-transitory, computer-readable media of claim 13, wherein the failure on the primary path is a node failure of a failed node on the primary path in the network area.

15. The tangible, non-transitory, computer-readable media of claim 13, the software when executed by a processor operable to:

send one or more messages through the network area, the one or more messages including a first value associated with the destination node, a second value associated with the protected label, and a third value associated with the unprotected label.

16. A method, comprising:

receiving a message destined for a destination node located in a network area of a computer environment, the message including at least a first packet and a second packet, the first packet associated with a first label corresponding to a protected label and the second packet associated with a second label corresponding to an unprotected label, the protected label and the unprotected label being associated with paths in the network area of the computer environment;

determining that a failure on a primary path of the network area occurred;

forwarding the first packet associated with the protected label over a backup tunnel path to the destination node based at least in part on the protected label associated with the first packet; and forwarding the second packet associated with the unprotected label over an alternate path to the destination node, wherein forwarding the second packet along the alternate path to the destination node includes forwarding the second packet along a loop formed with the source node, before the second packet is routed towards the destination node.

* * * * *